Aug. 21, 1945.　　J. J. TWARDOWSKI　　2,383,028
EXPANDING TOOL
Filed Oct. 25, 1943
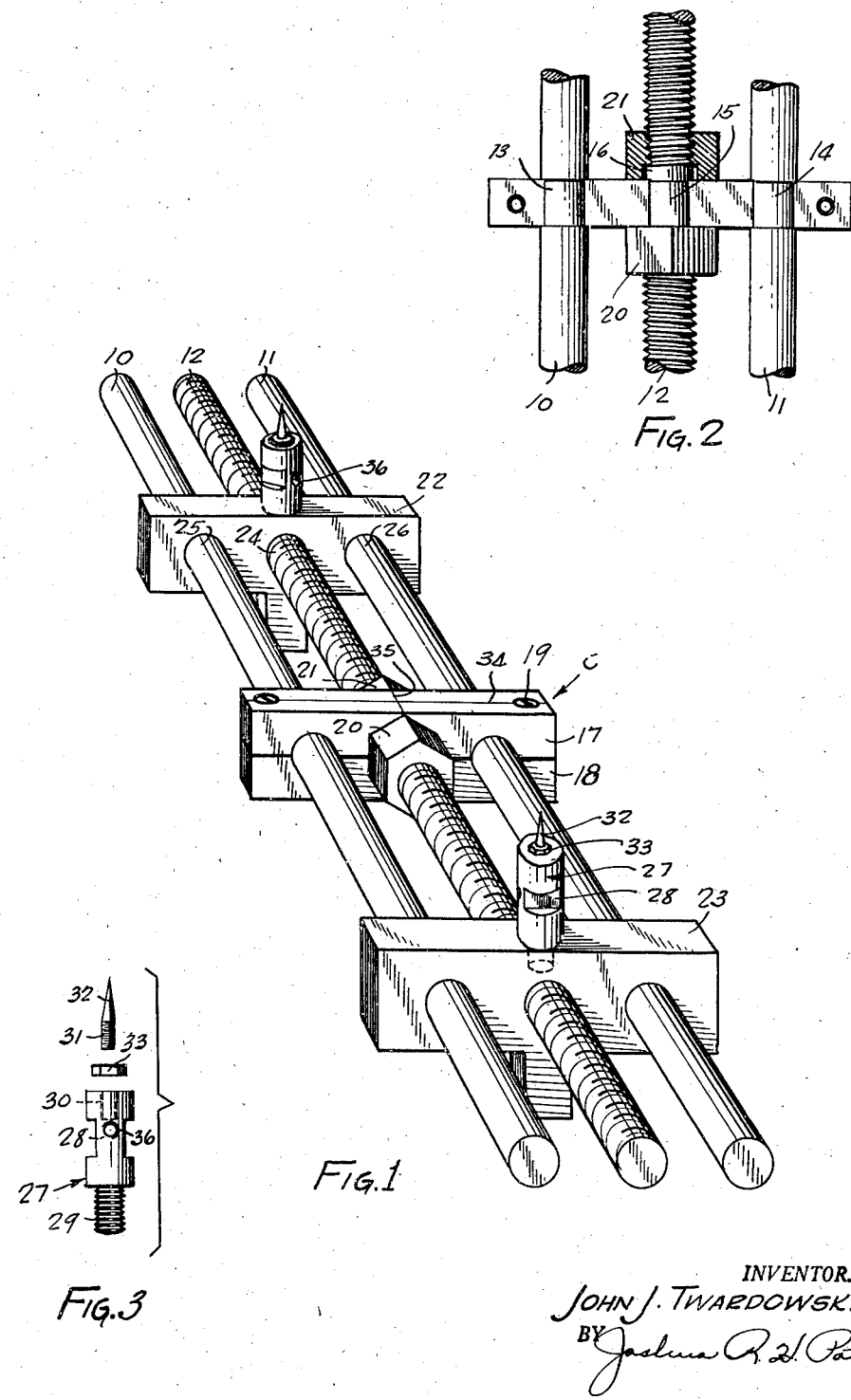
INVENTOR.
JOHN J. TWARDOWSKI Patented Aug. 21, 1945

2,383,028

UNITED STATES PATENT OFFICE 2,383,028

EXPANDING TOOL

John J. Twardowski, Philadelphia, Pa.

Application October 25, 1943, Serial No. 507,559

4 Claims. (Cl. 33—159)

This invention relates to expanding tools of the type commonly employed as gauges or trammels and is concerned primarily with the provision of a tool having novel features which afford advantages in the use of the tool.

An important object is the provision of an expanding tool of the character aforesaid which is susceptible of use with a high degree of accuracy to perform various types of work, and which is easily manipulated and adjusted to suit the conditions of the work.

Accordingly, a further object is the provision of an expanding tool of the type noted in which each of a pair of slides carries a scribing point with the slides mounted for relative movement on a slide bar and actuating screw assembly.

An important detailed object of the invention is the provision of means for locking the slides in an adjusted position.

A somewhat more detailed object of the invention is the provision of an expanding tool of the character aforesaid in which the scribing points themselves are replaceable, and the structural elements which immediately carry the scribing points are interchangeable.

Various other more detailed objects and advantages of the invention, such as arise in carrying out the above-noted ideas in a practical embodiment, will in part become apparent and in part be hereinafter stated as a description of the invention proceeds.

The invention, therefore, comprises an expanding tool intended to be used as a gauge or trammel, and which consists of a pair of relatively movable slides that are mounted on a slide bar and actuating screw assembly with each slide carrying a scribing point. Means is provided for locking the slides in an adjusted position.

For a full and more complete understanding of the invention, reference may be had to the following description and accompanying drawing, wherein:

Figure 1 is a perspective of an expanding tool made in accordance with the precepts of this invention;

Figure 2 is a detail taken as a top plan with parts broken away and shown in section; and Figure 3 is an elevational showing of the structure for mounting one of the scribing points, the parts being shown in exploded relation.

Referring now to the drawing, wherein like reference characters denote corresponding parts, and first more particularly to Figure 1, a pair of slide bars are designated 10 and 11. Between the slide bars 10 and 11 is an actuating screw 12 having oppositely threaded portions, much the same as a turnbuckle screw.

Referring for the moment more particularly to Figure 2, it will be noted that each of the slide bars 10 and 11 is formed with a portion of reduced diameter substantially midway thereof. These portions of reduced diameter are identified at 13 and 14. The actuating screw 12 has a similar portion 15 of reduced diameter. For a short distance on each side of the portion 15, the screw member 12 is free of threads providing the smooth parts 16.

A clamping assembly is referred to in its entirety by the reference character C and comprises complemental halves 17 and 18, each of which is provided with recesses which receive the portions 13, 14 and 15 of the slide bars and screw. After the elements 17 and 18 are assembled on the slide bars and screw, the assembled relation may be more or less permanently established by fastening these halves 17 and 18 together in any preferred manner such as by the screws represented at 19.

Carried by the actuating screw 12 on opposite sides of the clamp C are locking nuts 20 and 21. These nuts are of duplicate construction, and it will be noted from Figure 2 that each is countersunk to accommodate the smooth part 16 of the screw. The purpose of these locking nuts 20 and 21 will later be described.

The slides 22 and 23 are mounted for movement along the slide bars, and, inasmuch as these slides, together with the mechanism carried thereby, are of duplicate construction, only one of them needs here be described for the purpose of this specification. Thus, it is noted that the slide 22 has a central threaded opening 24 through which is threaded the actuating screw 12. On each side of the central opening 24 are smooth bores 25 and 26 through which the slides 10 and 11 pass.

Referring now more particularly to Figure 3, a carrier for a scribing point is shown at 27. The member 27 is formed with wrench engaging flats 28, and at one end carries a threaded plug 29 which is screwed into a complemental recess in the slide 22. At the opposite end, the carrier 27 is formed with a threaded recess 30 which receives the threaded portion 31 of a scribing point 32. A lock nut, shown at 33, may be employed to insure that the scribing point 32 remains in position.

When the slides 22 and 23 are to be expanded or contracted, the lock nuts 20 and 21 are first loosened so that they are retracted a slight distance from the central clamp C. The actuating screw 12 is now rotated, and, due to the threaded relation at the openings 24, the slides 22 and 23 are moved in a direction corresponding to the direction of rotation of the screw 12. Once the required distance between the slides 22 and 23 is accurately established, the lock nuts 20 and 21 may be tightened against the clamp C to positively maintain the adjusted position.

The upper and lower faces of the clamp halves, 17 and 18 respectively, may be provided with center lines as shown at 34 and 35, which will prove of aid for many uses of the tool. It is noted that the scribing point carriers 27 on the slides 22 and 23 are interchangeable and may be replaced as occasion demands. Likewise, the scribing points 32 may be removed for sharpening or replacement as may be required.

Each of the carriers 27 may also be formed with a threaded opening 36 which will prove of aid in some uses of the tool in layout work.

While a preferred specific embodiment of the invention is hereinbefore set forth, it is to be clearly understood that the invention is not to be limited to the exact constructions illustrated and described, because various modifications of these details may be provided in putting the invention into practice, within the purview of the appended claims.

What is claimed is:

1. In an expanding tool of the character described, an actuating screw, a pair of slide bars arranged on opposite sides of said screw, a central clamp assembled on said slide bars and screw, means to hold said central clamp against longitudinal movement relative to said slide bars and screw, a pair of slides carried by said slide bars and screw on opposite sides of said central clamp, and a scribing point carried by each of said slides.

2. In an expanding tool of the character described, a pair of slide bars with an actuating screw therebetween and maintained in this position by a clamping assembly, said clamping assembly consisting of complemental elements formed with recesses receiving reduced portions of said slide bars and screw, together with means for maintaining the complemental elements in tightly clamped position, a pair of slides arranged on opposite sides of said clamping assembly each slide being formed with a threaded opening into which is threaded the actuating screw, and a pair of smooth bores receiving the slide bars, and a scribing point carried by each of said slides.

3. In an expanding tool of the character described, a pair of slide bars with an actuating screw therebetween and maintained in this position by a clamping assembly, said clamping assembly consisting of complemental elements formed with recesses receiving reduced portions of said slide bars and screw, together with means for maintaining the complemental elements in tightly clamped position, a pair of slides arranged on opposite sides of said clamping assembly each slide being formed with a threaded opening into which is threaded the actuating screw, and a pair of smooth bores receiving the slide bars, each of said slides being formed with a threaded socket, a carrier screwed into said socket, and a scribing point detachably carried by said carrier.

4. In an expanding tool of the character described, a pair of slide bars with an actuating screw therebetween and maintained in this position by a clamping assembly, said clamping assembly consisting of complemental elements formed with recesses receiving reduced portions of said slide bars and screw, together with means for maintaining the complemental elements in tightly clamped position, and a pair of lock nuts carried by said actuating screw and arranged on opposite sides of said clamping assembly.

JOHN J. TWARDOWSKI.